(12) United States Patent
Faibish et al.

(10) Patent No.: US 9,779,108 B1
(45) Date of Patent: Oct. 3, 2017

(54) LUSTRE FILE SYSTEM

(71) Applicant: EMC Corporation, Hopkinton, MA (US)

(72) Inventors: Sorin Faibish, Newton, MA (US); Tao Peng, Beijing (CN); John M. Bent, Los Alamos, NM (US); Uday K. Gupta, Westford, MA (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 745 days.

(21) Appl. No.: 13/931,212

(22) Filed: Jun. 28, 2013

Related U.S. Application Data

(60) Provisional application No. 61/764,250, filed on Feb. 13, 2013.

(51) Int. Cl.
G06F 17/30 (2006.01)

(52) U.S. Cl.
CPC .............................. *G06F 17/30182* (2013.01)

(58) Field of Classification Search
CPC ........... G06F 12/0246; G06F 17/30067; H04L 12/5835; H04L 51/066; H04L 67/1097; H04L 67/28; H04L 67/2823; H04L 67/2842

See application file for complete search history.

(56) References Cited

U.S. PATENT DOCUMENTS

| | | | |
|---|---|---|---|
| 2012/0310892 A1* | 12/2012 | Dam .................. | G06F 17/30156 707/659 |
| 2013/0159364 A1* | 6/2013 | Grider ............... | G06F 17/30224 707/826 |
| 2013/0290385 A1* | 10/2013 | Morrey, III ....... | G06F 17/30144 707/822 |
| 2013/0304775 A1* | 11/2013 | Davis ................. | H04L 67/1097 707/827 |

* cited by examiner

*Primary Examiner* — Dinku Gerbresenbet
(74) *Attorney, Agent, or Firm* — Krishnendu Gupta; Konrad R. Lee

(57) ABSTRACT

A computer-executable method, system, and computer program product of managing I/O received within a Lustre file system, the computer-executable method, system, and computer program product comprising: receiving a data I/O request, wherein the data I/O request relates to data stored within the Lustre file system; processing the data I/O request in a journal stored on a fast data storage device within the Lustre file system; analyzing the journal to make a determination related to the data I/O request; and responding to the data I/O request.

9 Claims, 12 Drawing Sheets

LUSTRE FILE SYSTEM

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

CROSS REFERENCE TO RELATED APPLICATIONS

This application is related to U.S. Provisional Application Ser. No. 61/764,250 entitled "IMPROVED ARCHITECTURE USING PLFS", filed on Feb. 13, 2103, the teachings of which provisional application are hereby incorporated herein by reference in their entirety.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product of managing I/O received within a Lustre file system, the computer-executable method, system, and computer program product comprising: receiving a data I/O request, wherein the data I/O request relates to data stored within the Lustre file system; processing the data I/O request in a journal stored on a fast data storage device within the Lustre file system; analyzing the journal to make a determination related to the data I/O request; and responding to the data I/O request.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
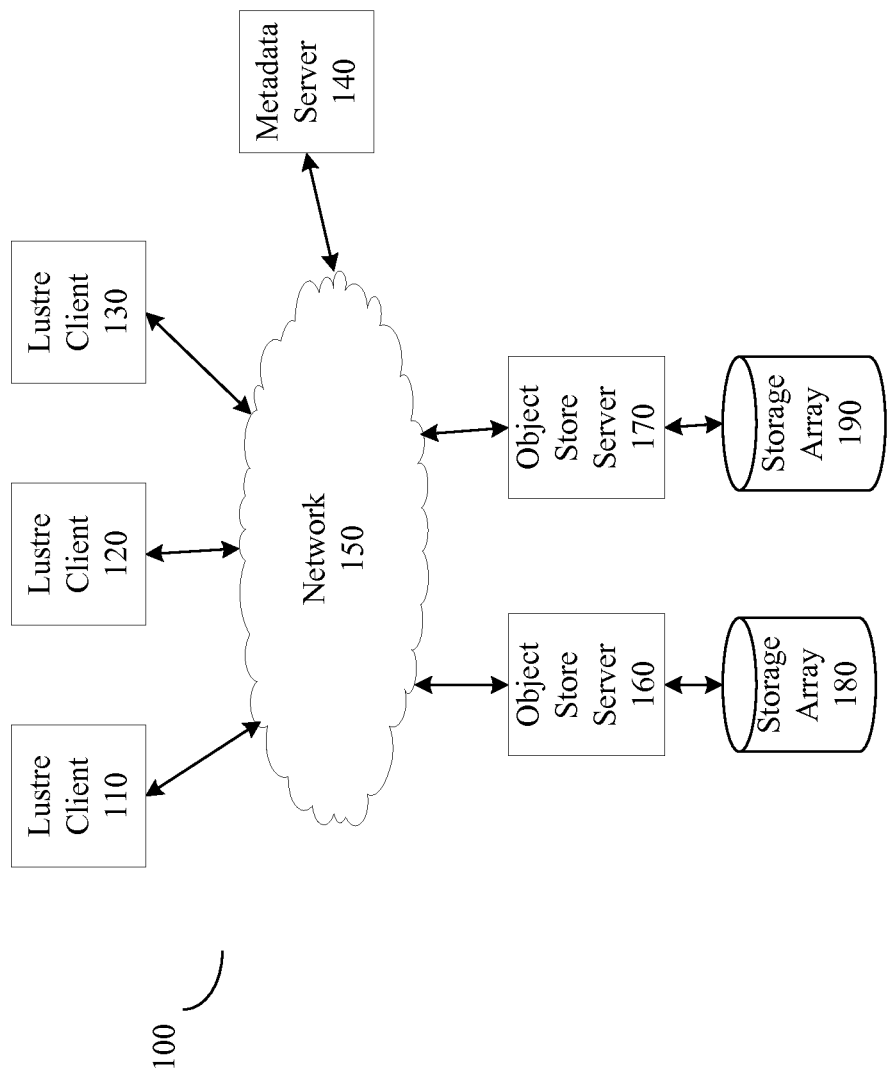
FIG. 1 is a simplified illustration a Lustre file system, in accordance with an embodiment of the present disclosure.

Generally, Lustre performance is limited by the performance of the disk storage which is dependent on the number of disks within the file system. Traditionally, workloads for HPC are bursty and as a result the peak performance of each disk may need to be very high in order to achieve desired performance requirements. Typically, high performance requirements may require consumers to buy disks for peak performance while they are utilized at peak performance for a small amount of time. Generally, solutions for intelligent caching within a Lustre file system would be useful and may not have been previously possible.

Traditionally, to achieve very high bandwidth using rotating disk, one may need to employ large number of rotating disks which may require large number of cabinets and therefore occupy expensive floor space as well as excessive cooling, power and maintenance cost. Typically, due to high bandwidth requirement of such supercomputers on storage, use of traditional rotating drives may be very expensive and may exceed target budgets. Generally, evolutionary architecture may be designed and tested to keep the costs down while meet the required bandwidth. Traditionally, a known set of system requirements may have been used to design two solutions; one with only rotating disks and second using a hybrid model to compare costs, power, and space (number of racks). Typically, a hybrid model refers to a specific case of Lustre that does not include FAST cache.

Traditionally, a Lustre file system has three major functional units. Generally, a Lustre file system includes one or more meta data servers (MDSs) that has one or more metadata targets (MDTs) per Lustre filesystem that stores namespace metadata, such as filenames, directories, access permissions, and file layout. Typically, the MDT data is stored in a local disk filesystem. Generally, the Lustre metadata server is only involved in pathname and permission checks, and is not involved in file I/O operations, avoiding I/O scalability bottlenecks on the meta data server.

Traditionally, a Lustre file system includes one or more object storage servers (OSSes) that store file data on one or more object storage targets (OSTs). Generally, an OSS typically serves between two and eight OSTs, with each OST managing a single local disk filesystem. Typically, the capacity of a Lustre file system is the sum of the capacities provided by the OSTs. Traditionally, a lustre file system includes Lustre Client(s) that access and use the data. Generally, Lustre presents all Lustre clients with a unified namespace for all of the files and data in the filesystem, using standard POIX semantics, and allows concurrent and coherent read and write access to the files in the filesystem.

Traditionally, the MDT, OST, and client may be on the same node (usually for testing purposes), but in typical production installations these functions are on separate nodes communicating over a network. Generally, the Lustre Network (LNET) layer supports several network interconnects, including: native Infiniband verbs; TCP/IP on Ethernet, and other networks; Myrinet; Quadrics; and other proprietary network technologies such as the Cray's SeaStar, Gemini and Aries interconnects. Typically, Lustre will take advantage of remote direct memory access (RDMA) transfers, when available, to improve throughput and reduce CPU usage.

Traditionally, the storage used for the MDT and OST backing file systems is normally provided by hardware RAID devices, though will work with block devices. Generally, the Lustre OSS and MDS servers read, write, and modify data in the format imposed by the backing filesystem and return this data to the clients. Typically, clients do not have any direct access to the underlying storage.

Typically, an OST is a dedicated filesystem that exports an interface to byte ranges of objects for read/write operations. Generally, an MDT is a dedicated filesystem that controls file access and tells clients the layout of the object(s) that make up each file. Traditionally, MDTs and OSTs use an enhanced version of ext4 called ldiskfs to store data.

Traditionally, an Object-based Storage Device (OSD) may be a computer storage device, similar to disk storage but working at a higher level. Generally, instead of providing a block-oriented interface that reads and writes fixed sized blocks of data, an OSD organizes data into flexible-sized data containers, called objects. Typically, each object has both data and metadata. Traditionally, a command interface to the OSD includes commands to create and delete objects, write bytes and read bytes to and from individual objects, and to set and get attributes on objects. Generally, an OSD is responsible for managing the storage of objects and their metadata. Traditionally, OSD implements a security mechanism that provides per-object and per-command access control.

Traditionally, when a client accesses a file, it completes a filename lookup on the MDS. Generally, as a result, a new file is created on behalf of the client or the layout of an existing file is returned to the client. Typically, for read or write operations, the client then interprets the layout in the logical object volume (LOV) layer, which maps the offset and size to one or more objects, each residing on a separate OST. Traditionally, the client then locks the file range being operated on and executes one or more parallel read or write operations directly to the OSTs. Generally, bottlenecks for client-to-OST communications are eliminated, so the total bandwidth available for the clients to read and write data scales almost linearly with the number of OSTs in the filesystem. Traditionally, after the initial lookup of the file layout, the MDS is not involved in file IO. Typically, clients do not directly modify the objects on the OST file systems, but, instead, delegate this task to OSSes. Generally, this approach ensures scalability for large-scale clusters and supercomputers, as well as improved security and reliability.

In many embodiments, the current disclosure may enable a Lustre FS architecture using a Parallel Logged File System (PLFS) as a data synchronization mechanism. In various embodiments, the introduction of a flash SSD, such as EMC's VNX-F flash appliance, may enable use of various software modules and algorithms on an OSS of Lustre that may allow improved caching utilizing information accessible by a Lustre OSS. In some embodiments, PLFS may be used to implement a virtual file system. In other embodiments, journaling may be used to preserve the location of objects on an OST and/or OSD. In certain embodiments, PLFS may intercept and register each IO requests from a client and may write the IO data and journal on flash devices for later use.

In many embodiments, the current disclosure may enable the implementation of a PLFS with an Object Storage Target (OST) and/or an Object-based Storage Device (OSD) within a Lustre File system. In some embodiments, the current disclosure may enable an OST and/or OSD to be transparent to a Lustre OSS. In many embodiments, the current disclosure may enable a journal PLFS to call a data mover that may sync the data to data storage that may be transparent to the Lustre OSS. In some embodiments, the current disclosure may enable pre-fetch of entire objects and may improve the cache efficiency and achieve performance similar to an all flash solution and/or provide improved disk performance. In various embodiments, the current disclosure may implement the improved caching module using addressing objects rather than blocks or files. In many embodiments, the current disclosure may enable "smooth" the use of rotational data storage drive and may enable these drives to be used more uniformly at a lower speed for a longer time. In various embodiments, smooth may be explained as disks that may be more uniformly used by smoothing short write bursts with continuous movement of the disk heads.

In various embodiments, the solution may have used rotating disks as well as FLASH as storage devices. In many embodiments, the current disclosure may enable balancing the two types of storage elements and designing the proper software to take advantage of FLASH. In many embodiments, the current disclosure may provide a scalable design in which scalable storage unit building blocks may allow for modular expansion and deployment of the Scalable Storage system (SSS). In various embodiments, a SSS may be comprised of multiple Lustre File Systems on a Scalable Storage Cluster (SSC). In some embodiments, the most basic building block may be referred to as the scalable storage unit (SSU). In various embodiments, the SSUs may consist of a basic set of independent storage controller(s) (SCs), their associated storage media, and peripheral systems (such as network switches) for host connectivity.

In many embodiments, SSUs may be grouped into scalable storage clusters (SSCs). In some embodiments, SSCs may consist of one or more SSUs such that one or more industry-standard equipment racks are filled. In various embodiments, a single SSC may be self-sustaining, i.e. containing all hardware, firmware, and software to support creation of a file system on that SSC. In many embodiments, this may mean SSC may have all the elements to present complete Lustre File System solution which may include MDS (Meta Data Server), OSS (Object storage Servers), OST and interconnecting switches In many embodiments, a PLFS enabled OSD on a single OSS server may communicate with other OSS servers having PLFS enabled OSDs. In various embodiments, one or more PLFS enabled OSD may be enabled to form a global view of workload at a system level. In some embodiments, the PLFS enabled OSD may be enabled to send and/or receive control commands to guide the movement of data within each respective OSS server.

In many embodiments, a PLFS enabled OSD may be enabled to provide a set of interfaces to allow users and/or external controllers (such as job schedulers) to control the data placement on an OSS server. In various embodiments, a PLFS enabled OSD may be capable of interacting between multiple backend layers. For example, in an embodiment, a PLFS enabled OSD may be enabled to communicate with a tier of Flash SSDs and/or a tier of rotational disk drives. In many embodiments, for reads, data may be pre-fetched from accessible data storage. In some embodiments, for writes, data may be written to available data storage. In certain embodiments, a PLFS enabled OSD may enable initial data writes to a faster Flash SSD and later may be enabled to migrate data from the faster Flash SSD to other data storage drives. In many embodiments, the current disclosure may enable a mechanism to migrate data between caching device and persistent storage, and may enable necessary policies to control the migration of data. In other embodiments, the current disclosure may enable a PLFS enabled OSD to communicate with sibling PLFS enabled OSD s within the same OSS node or on other OSS nodes and provide hints on better data placement. In various embodiments, the current disclosure may enable proper user space interfaces to integrate with existing operating system utilities.

In many embodiments, the current disclosure may enable implementation of a data mover which may be enabled to move data between data storage devices accessible from a PLFS enabled OSD. In various embodiments, a data mover may provide an interface to add a copy task and assign it to worker threads. In other embodiments, a data mover may be enabled to explicitly mark a file as being copied from one data storage device to a second data storage device, so that the PLFS enabled OSD will not use the file white it is being copied.

In many embodiments, the current disclosure may enable creation of a PLFS enabled OSD including multiple interfaces. In various embodiments, a PLFS enabled OSD may include an OSD interface, an interface to other PLFS enabled OSDs, and/or interfaces to external controllers. In some embodiments, communication between PLFS enabled OSDs may include inter-node communication. In some embodiments, PLFS enabled OSD may use either sockets or MPI to pass information to each other. In various embodiments, when an object is read on one PLFS enabled OSD and the PLFS enabled OSD figures out that the file is striped across multiple OSDs/OSTs, the PLFS enabled OSD may be enable to tell other nodes to prefetch the file. In many embodiments, the PLFS enabled OSD may send a control command to other PLFS enabled OSD to ask the corresponding PLFS enabled OSD to prefetch the data.

In many embodiments, a PLFS enabled OSD may provide an interface to allow external controllers to control data placement on the PLFS enabled OSD. In some embodiments, a linkable client library may be provided to external controllers, as well as command line tools. In various embodiments, a PLFS enabled OSD may be enabled to work with existing Lustre utilities.

Refer now to the example embodiment of FIG. 1. FIG. 1 is a simplified illustration of a Lustre File system, in accordance with an embodiment of the present disclosure. As shown, Lustre File system 100 includes Metadata server 140, Object Store Server (OSS) 160, 170, and are connected through network 150. In this embodiment, OSS 160 is in communication with Storage array 180. OSS 170 is in communication with Storage array 190. As shown, data sent to OSS 160 is processed at OSS 160 and stored in Storage Array 180. Similarly, data sent to OSS 170 is processed at OSS 170 and stored in Storage Array 190. In this embodiment, Lustre client 110, 120, 130 are shown interacting with Lustre File System 100. Lustre File System 100 is enabled to handle I/O requests from Lustre Client 110, 120, 130. In many embodiments, I/O requests may include reading, writing, storage, and/or managing data managed by each OSS.

Figure 2:
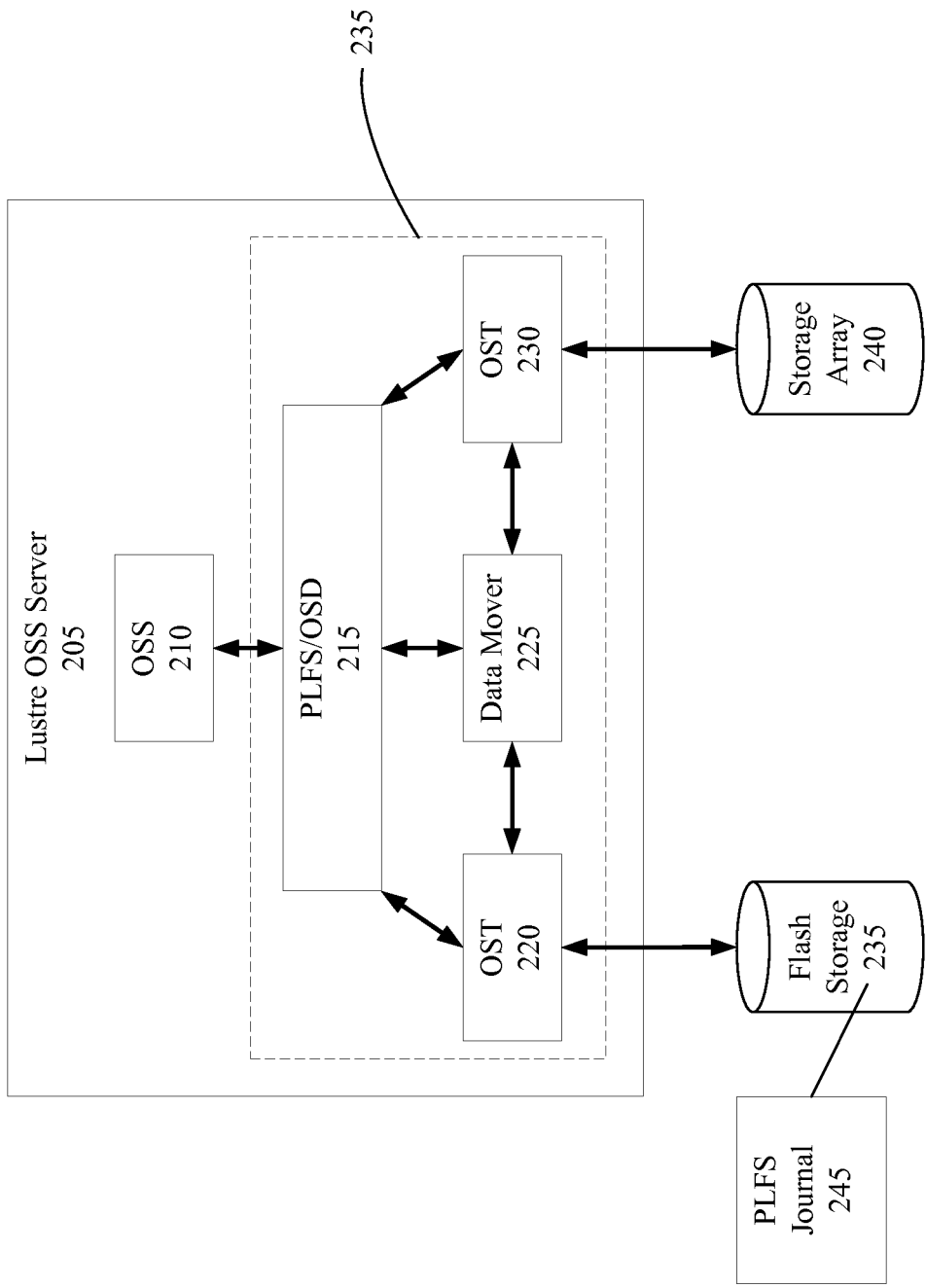
FIG. 2 is a simplified illustration of an OSS server within a Lustre File system, in accordance with an embodiment of the present disclosure.

Refer now to the example embodiment of FIG. 2. FIG. 2 is a simplified illustration of an OSS server within a Lustre File system, in accordance with an embodiment of the present disclosure. As shown, Lustre OSS server 205 includes OSS 210 and PLFS enabled OSD 235. PLFS enabled OSD includes a PLFS/OSD module 215, OST 220, 230, and data mover 225. In this embodiment, OST 220 is enabled to utilize Flash storage 235. OST 230 is enabled to utilize Storage Array 240. As shown, storage array 240 is comprised of rotational disks. In various embodiments, a storage array may include a varied array of data storage devices. As shown, PLFS/OSD module 215 is enabled to journal I/O requests received from OSS 210 in PLFS Journal 245 stored on Flash storage 235.

Figure 3:
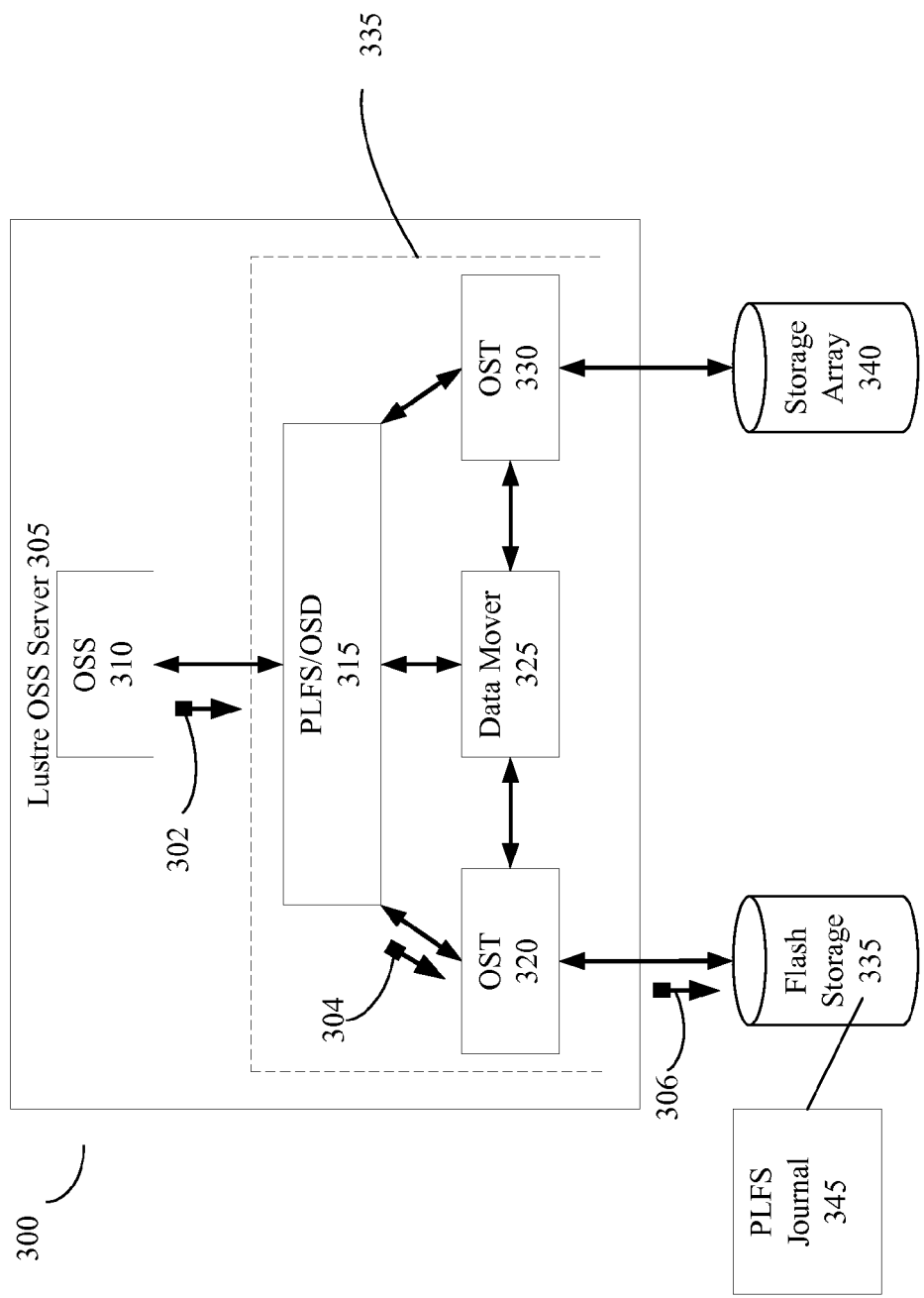
FIG. 3 is a simplified illustration of message within an OSS server in a Lustre file system, in accordance with an embodiment of the present disclosure.

Refer now to the example embodiment of FIG. 3. FIG. 3 is a simplified illustration of messaging within an OSS server in a Lustre file system, in accordance with an embodiment of the present disclosure. As shown, Lustre OSS server 305 includes OSS 310 and PLFS enabled OSD 335. PLFS enabled OSD 335 includes a PLFS/OSD module 315, OST 320, 330, and data mover 325. In this embodiment, PLFS enabled OSD 335 receives an I/O request from OSS 310 in the form of message 302. As shown, PLFS/OST 315 processes and fulfills I/O request using messages 304, 306. Upon receipt of I/O request, PLFS/OST 315 logs information related to the I/O request in PLFS Journal 345.

Figure 4:
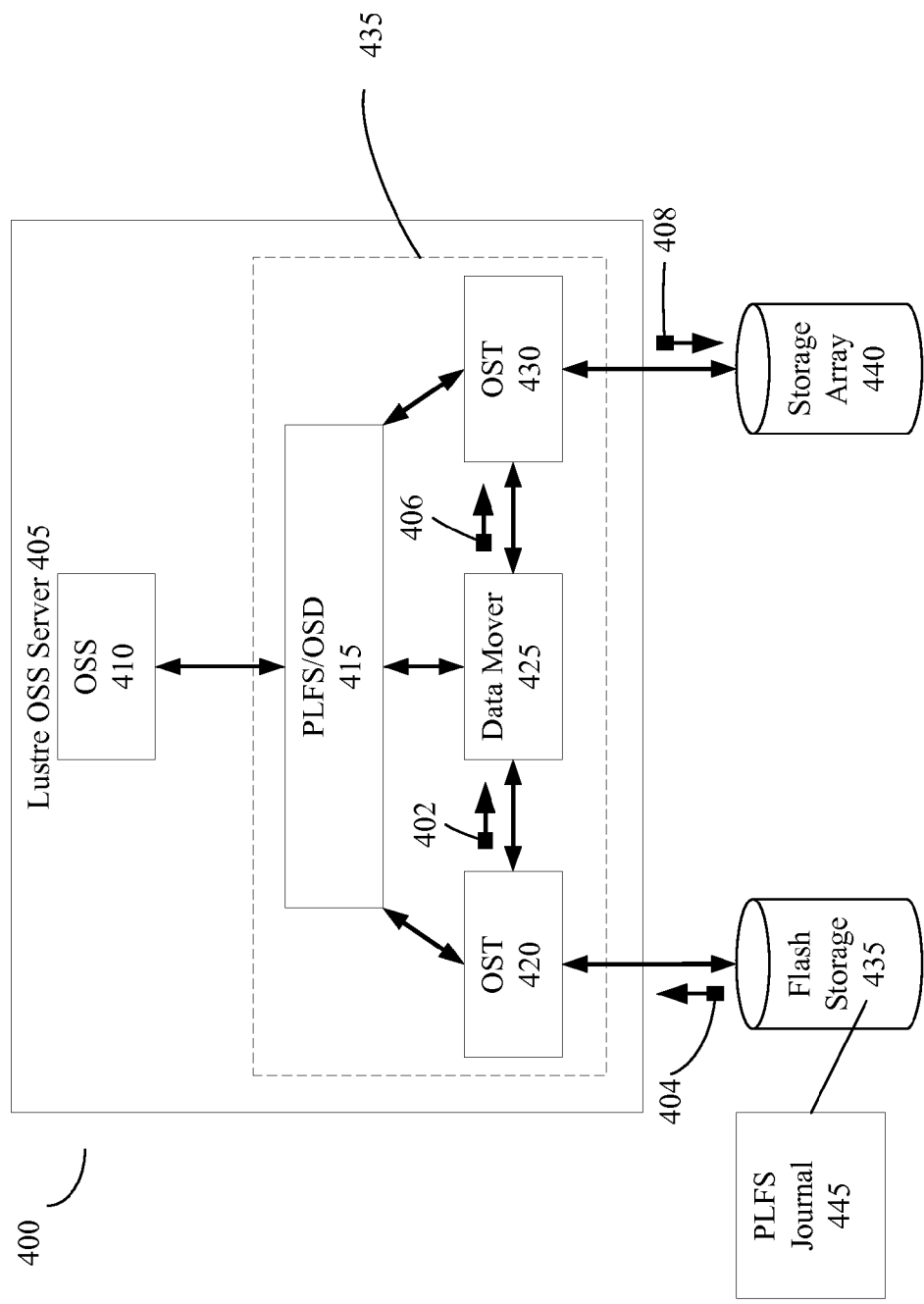
FIG. 4 is a simplified illustration of a process within an OSS Server in a Lustre file system, in accordance with an embodiment of the present disclosure.

Refer now to the example embodiment of FIG. 4. FIG. 4 is a simplified illustration of a background write-back process within an OSS in a Lustre file system. As shown, Lustre OSS server 405 includes OSS 410 and PLFS enabled OSD 435. PLFS enabled OSD 435 includes a PLFS/OSD module 415, OST 420, 430, and data mover 425. In this embodiment, PLFS/OST module manages OST 420, 430. PLFS/OST signals to data mover 425 to initiate a background write-back process moving data from Flash storage 435 to storage array 440 using messages 404, 402, 406, 408. In many embodiments, a background write-back process may take place while OSS server resources are not heavily used. In various embodiments, the PLFS/OST module may direct the data mover to transfer data between accessible OSTs based on data usage and/or data policies. In various embodiments, data usage and/o data policies may refer to different write-back policies to ensure that the flash does not fill and stop the incoming IOs. As Data mover 425 moves data between Flash 435 and Storage array 440, PLFS/OST module 415 journals I/Os, data placement, and/or other data storage meta data.

Figure 5:
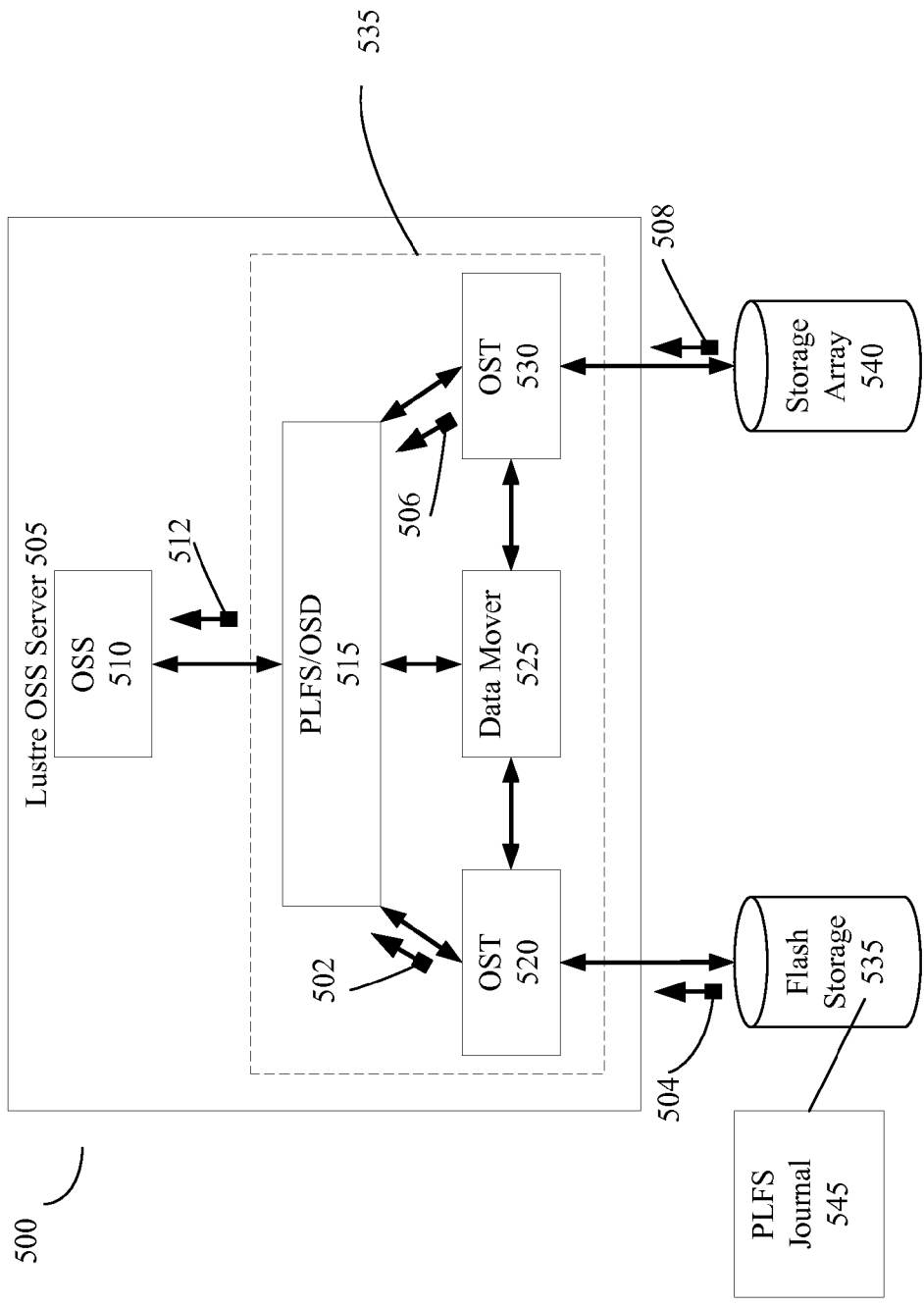
FIG. 5 is a simplified illustration of handling an I/O request within an OSS Server of a Lustre file system, in accordance with an embodiment of the present disclosure.

Refer now to the example embodiment of FIG. 5. FIG. 5 is a simplified illustration of a I/O request from data storage within a Lustre file system, in accordance with an embodiment of the present disclosure. As shown, Lustre OSS server 505 includes OSS 510 and PLFS enabled OSD 535. PLFS enabled OSD 535 includes a PLFS/OSD module 515, OST 520, 530, and data mover 525. In this embodiment, OSS sends a read request to PLFS enabled OSD 535. PLFS/OSD 515 queries and requests data from Flash storage 535 and/or storage array 540. As shown, if PLFS/OSD 515 finds requested data within flash storage 535, PLFS/OSD 515 returns requested data and the process finishes. If PLFS/OSD 515 does not find the requested data within flash storage 535, PLFS/OSD 515 queries Storage array 540 and returns the requested data to OSS 510. PLFS/OSD 515 journals each I/O transaction in PLFS journal 545 and makes determinations on whether data stored on storage array 540 should be pre-fetched to flash storage 535.

Figure 6:
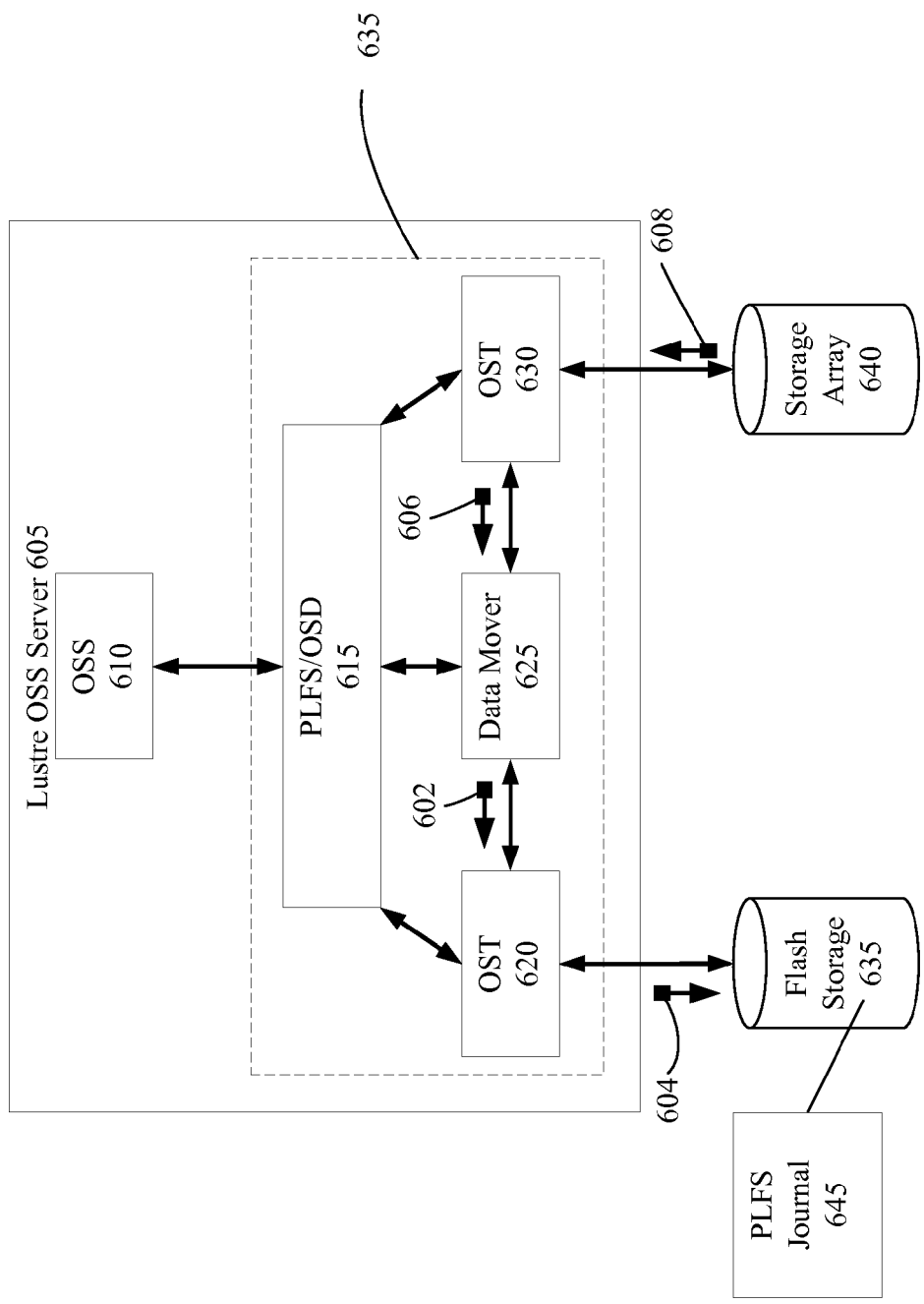
FIG. 6 is an a simplified illustration of a Parallel Logged File System (PLFS) enabled OSD pre-fetching data within an OSS server in a Lustre file system, in accordance with an embodiment of the present disclosure.

Refer now to the example embodiment of FIG. 6. FIG. 6 is a simplified illustration of a PLFS enabled OSD pre-fetching data within a Lustre OSS server, in accordance with an embodiment of the current disclosure. As shown, Lustre OSS server 605 includes OSS 610 and PLFS enabled OSD 635. PLFS enabled OSD 635 includes a PLFS/OSD module 615, OST 620, 630, and data mover 625. In this embodiment, PLFS/OSD module 615 has determined from analyzing PLFS Journal that pre-fetching of data stored on storage array 640 would increase system performance. As shown, associated data blocks are being pre-fetched from storage array 640 using messages 602, 604, 606, 608.

Figure 7:
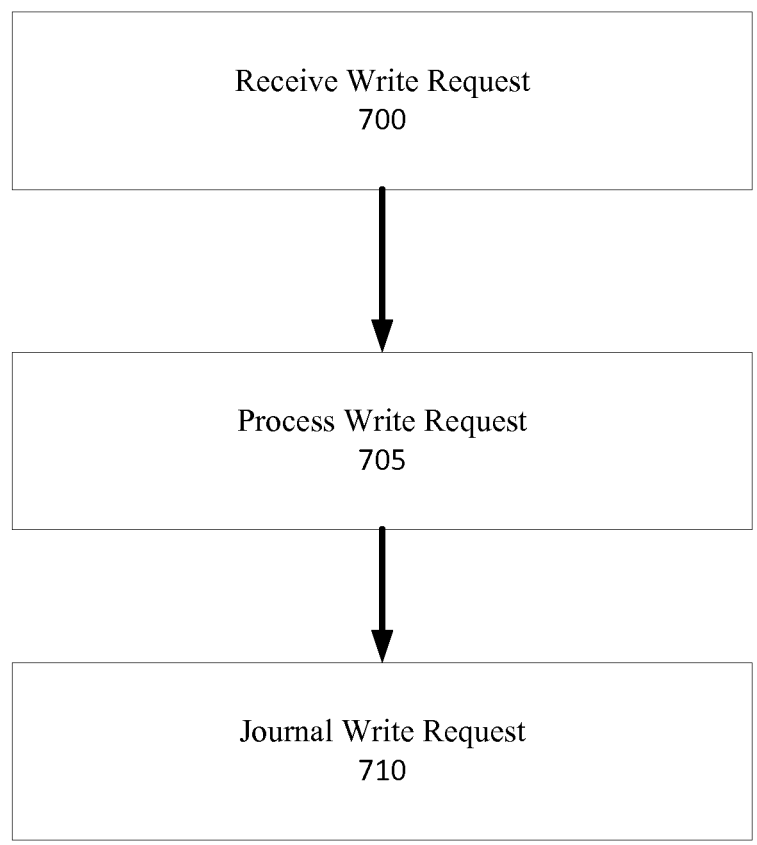
FIG. 7 is an example embodiment of a method of managing a data I/O request on an OSS Server within a Lustre File system, in accordance with an embodiment of the present disclosure.

Refer now to the example embodiments of FIGS. 3 and 7. FIG. 7 is an example embodiment of a method of managing a data I/O request to write a data block from an OSS on a Lustre File System, as shown in FIG. 4, in accordance with an embodiment of the present disclosure. As shown, Lustre OSS server 305 includes OSS 310 and PLFS enabled OSD 335. PLFS enabled OSD 335 includes a PLFS/OSD module 315, OST 320, 330, and data mover 325. PLFS/OSD 315 receives message 302 which is an I/O request to write data to available data storage (Step 700). PLFS/OSD 315 processes write request (Step 705) by sending the I/O request to write data to Flash storage 335 using messages 304, 306. PLFS/OSD 315 journals the I/O request to write data to available data storage in PLFS Journal 345 (Step 710).

Figure 8:
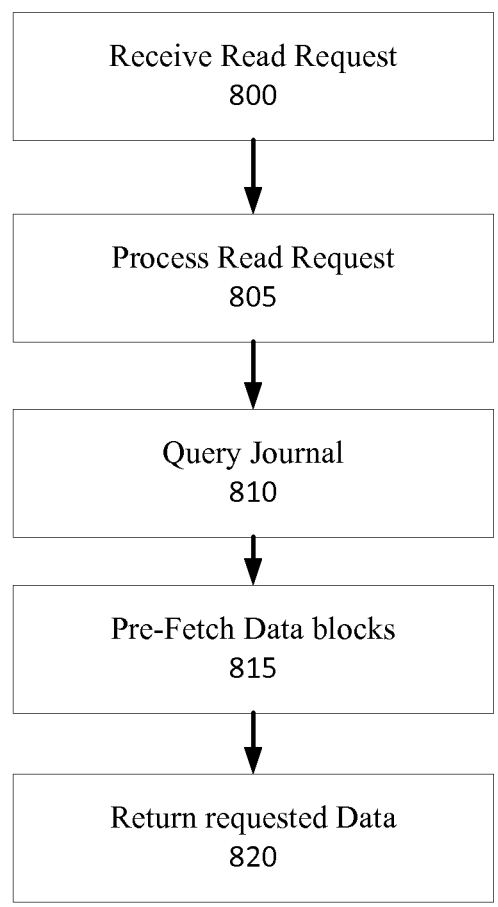
FIG. 8 is an alternative example embodiment of a method of managing a data I/O request on an OSS Server within a Lustre File system, in accordance with an embodiment of the present disclosure.

Refer now to the example embodiments of FIGS. 6 and 8. FIG. 8 is an example embodiment of a method of managing a data I/O request to read a data block from an OSS on a Lustre File System, as shown in FIG. 6, in accordance with an embodiment of the present disclosure. As shown, PLFS/OSD 615 receives a data I/O request to read a data block from available data storage accessible by PLFS enabled OSD 635 (Step 800). PLFS/OSD module 615 processes the read request (Step 800) by querying PLFS Journal 645 (Step 810) to determine if the requested data blocks are associated with a larger data block. If PLFS/OSD module 615 determines that the requested data blocks are associated with a larger data block, PLFS/OSD module 615 pre-fetches data blocks (Step 815) from storage array 640. Pre-fetched data blocks are included in messages 602, 604, 606, 608 as the pre-fetched data blocks are moved from storage array 640 to flash storage 635 via OST 620, 630 and Data mover 625. Upon completion of pre-fetching data blocks, PLFS/OSD returns requested data (Step 820) to requester.

Figure 9:
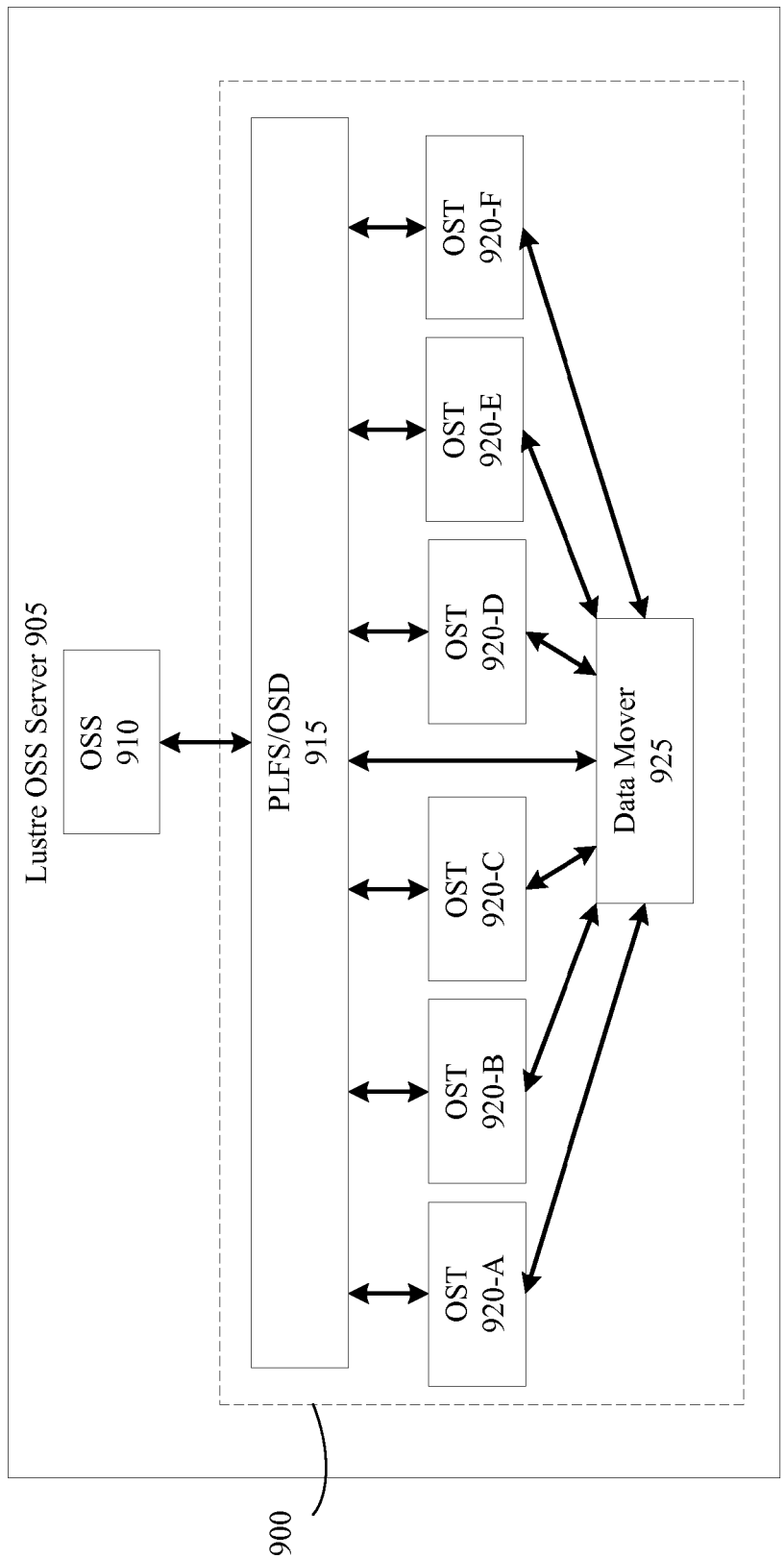
FIG. 9 is an alternative example embodiment of a PLFS enabled OSD within an OSS Server, in accordance with an embodiment of the present disclosure.

Refer now to the example embodiment of FIG. 9. FIG. 9 is an alternative example embodiment of a PLFS enabled OSD within an OSS, in accordance with the present disclosure. As shown, Lustre OSS Server 905 includes PLFS enable OSD 900 and OSS module 910. PLFS enabled OSD 900 includes PLFS/OSD module 915 which is controlling and connected to OST (920-A, 920-B, 920-C, 920-D, 920-E, 920-F, 920 generally) and data mover 925. Each OST is enabled to communicate with a data storage device (not shown) as illustrated in FIG. 2-6. In many embodiments, a PLFS/OSD module may be enabled to manage a variable number of OSTs as well as manage and move data stored on data storage accessible through each OST.

Figure 10:
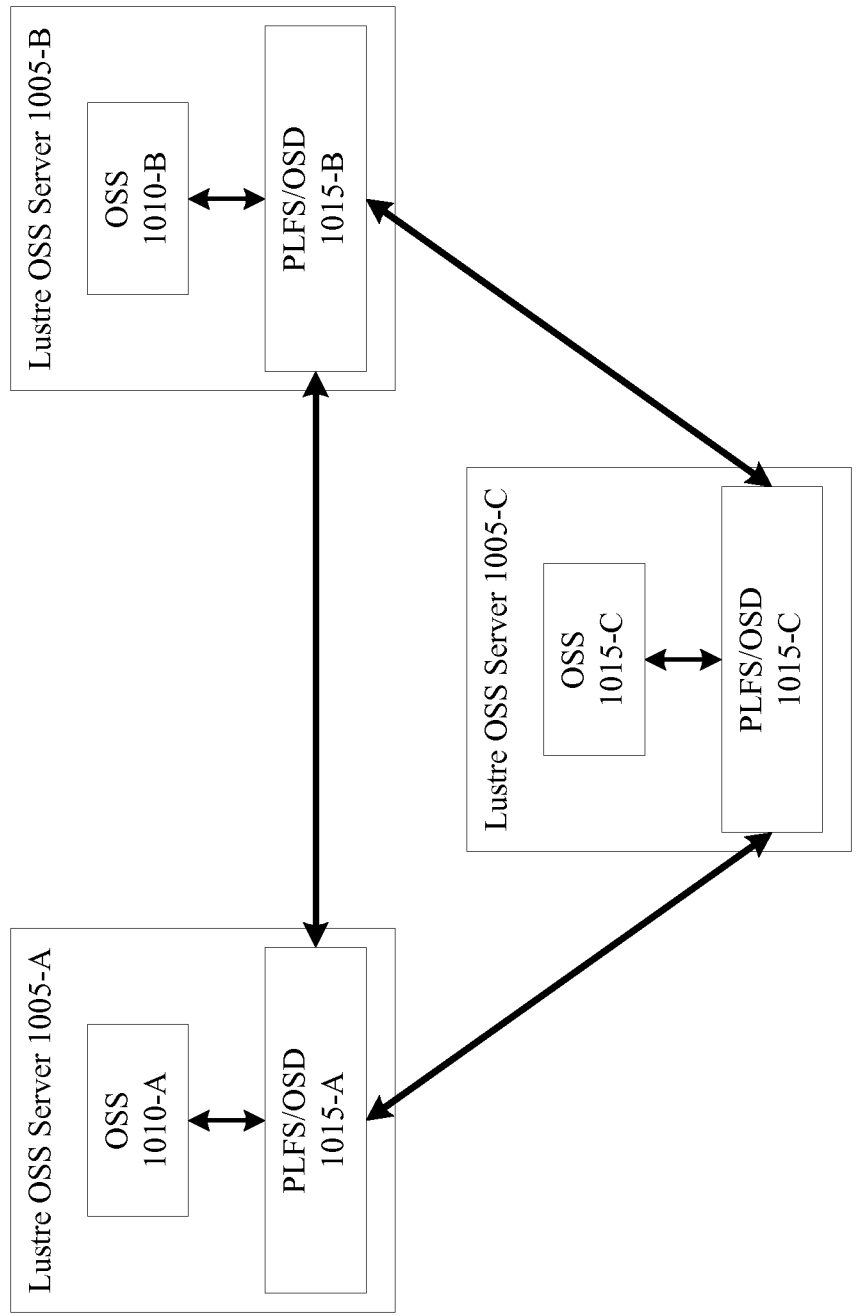
FIG. 10 is an example embodiment of multiple OSS servers in communication in a Lustre file system, in accordance with an embodiment of the present disclosure

Refer now to the example embodiment of FIG. 10. FIG. 10 is an example embodiment of multiple OSS in communication with each other in a Lustre File System, in accordance with an embodiment of the present disclosure. As shown, each Lustre OSS Server (1005-A, 1005-B, 1005-C, 1005 generally) includes an OSS module (1010-A, 1010-B, 1010-C, 1010 generally) and a PLFS/OSD module (1015-A, 1015-B, 1015-C, 1015 generally). In this embodiment, each PLFS/OSD module 1015 is enabled to communicate with other PLFS/OSD modules with a Lustre file system. Each PLFS/OSD module 1015 is enabled to provide information based on journaled I/Os to each respective PLFS/OSD module 1015. In many embodiments, a PLFS enabled OSD may be able to provide hints to a second PLFS enabled OSD as to what data to pre-fetch. In various embodiments, a PLFS enabled OSD may be enabled to synchronize journaled information stored on each respective PLFS enabled OSD.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 11:
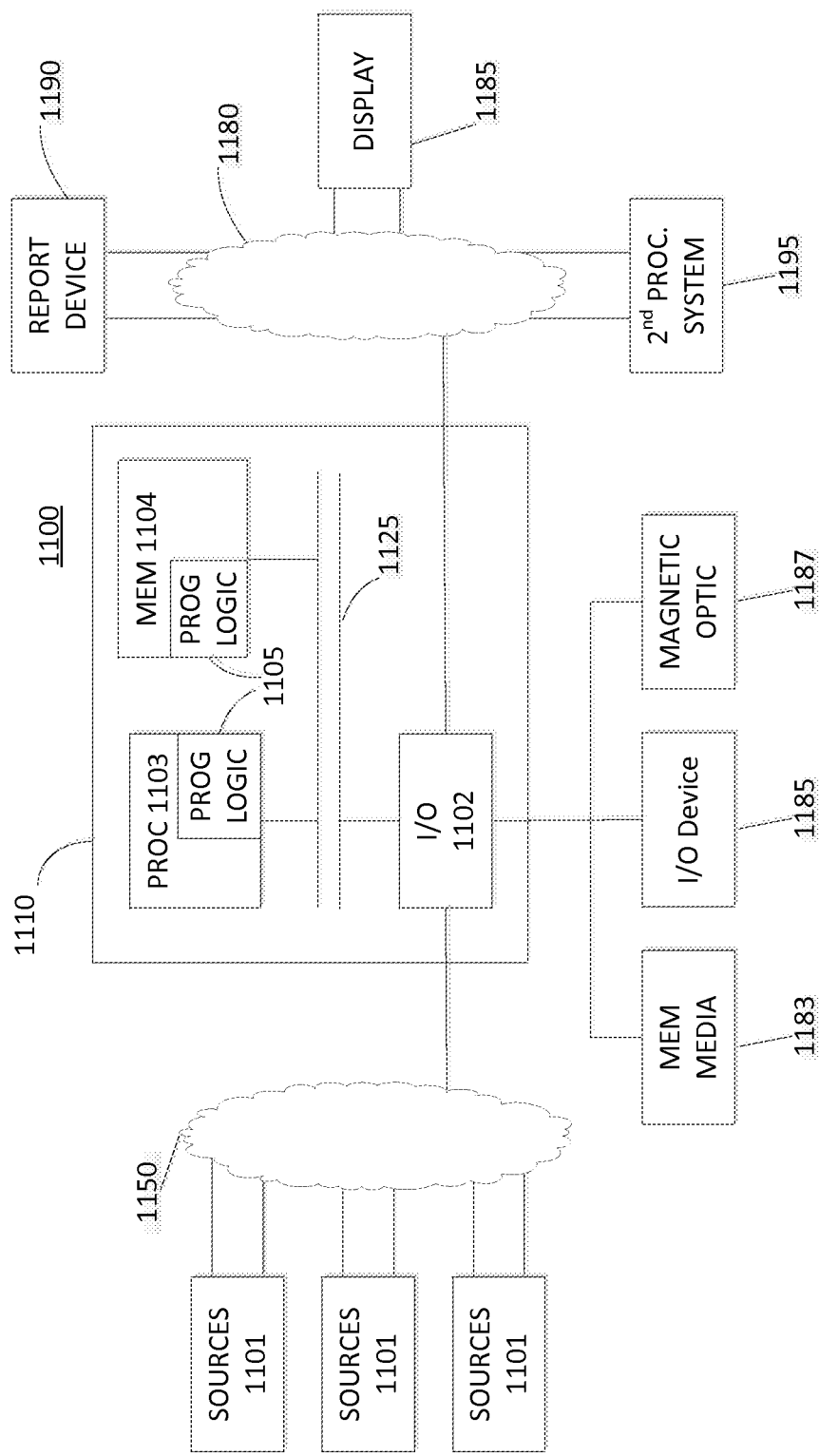
FIG. 11 is an example of an embodiment of an apparatus that may utilize the techniques described herein, in accordance with an embodiment of the present disclosure.

FIG. 11 is a block diagram illustrating an apparatus, such as a computer 1110 in a network 1100, which may utilize the techniques described herein according to an example embodiment of the present invention. The computer 1110 may include one or more I/O ports 1102, a processor 1103, and memory 1104, all of which may be connected by an interconnect 1125, such as a bus. Processor 1103 may include program logic 1105. The I/O port 1102 may provide connectivity to memory media 1183, I/O devices 1185, and drives 1187, such as magnetic or optical drives. When the program code is loaded into memory 804 and executed by the computer 1110, the machine becomes an apparatus for practicing the invention. When implemented on one or more general-purpose processors 1103, the program code combines with such a processor to provide a unique apparatus that operates analogously to specific logic circuits. As such, a general purpose digital machine can be transformed into a special purpose digital machine.

Figure 12:
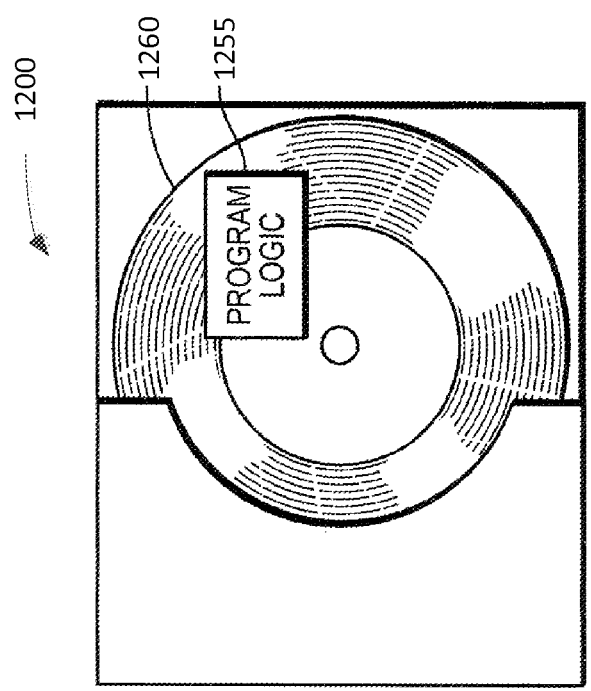
FIG. 12 is an example of a method embodied on a computer readable storage medium that may utilize the techniques described herein, in accordance with an embodiment of the present disclosure.

FIG. 12 is a block diagram illustrating a method embodied on a computer readable storage medium 1260 that may utilize the techniques described herein according to an example embodiment of the present invention. FIG. 12 shows Program Logic 1255 embodied on a computer-readable medium 1260 as shown, and wherein the Logic is encoded in computer-executable code configured for carrying out the methods of this invention and thereby forming a Computer Program Product 1200. Program Logic 1255 may be the same logic 1105 on memory 1104 loaded on processor 1103 in FIG. 11. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing I/O received within a Lustre file system including two or more object-based storage devices (OSDs) and one or more Object Storage Targets (OST), the computer-executable method comprising:
   using a Parallel Logged File system (PLFS) on the OSDs and OSTs to provide data storage for the Lustre file system;
   receiving a data I/O request, wherein the data I/O request relates to data stored within the Lustre file system;
   processing the data I/O request in a journal stored on a flash data storage device within the Lustre file system;
   analyzing the journal to make a determination related to the data I/O request;
   wherein each OSD within the Lustre file system is enabled to communicate with other OSDs within the Lustre file system to facilitate the analyzing and to provide hints for data placement;
   providing hints for data placement, wherein the two or more OSDs are in communication to facilitate data placement;
   wherein the analyzing comprises:
      analyzing the data I/O requests recorded in the journal to determine whether one or more data blocks are associated with the data I/O request;
      based on a positive determination that one or more data blocks are associated with the data I/O request, pre-fetching the one or more data blocks; and
      based on a negative determination that one or more data blocks are not associated with the data I/O request, processing a write-back of one or more data blocks; and
   responding to the data I/O request.

2. The computer-executable method of claim 1, wherein the Lustre file system is comprised of a first Lustre Object Store Server and a second Object Store Server; and
   wherein the analyzing comprises:
      analyzing, at the first Lustre Object Storage Server the data I/O requests recorded in the journal to determine whether one or more data blocks are associated with the data I/O request are located on the first Lustre Object Storage Server and the second Object Store Server;
      based on a positive determination, providing a hint to the second Object Store Server, wherein the hint is enabled to include information on data placement.

3. The computer-executable method of claim 1, wherein the Lustre file system is comprised of a first Lustre Object Store Server and a second Object Store Server; and
   wherein the processing comprises
      analyzing the data I/O request;
      storing a journal of the data I/O request on a flash data storage device within the first Lustre Object Store Server; and
      synchronizing the journal of the data I/O request with the second Object Store Server.

4. A system, comprising:
   a luster file system including one or more object-based storage devices (OSDs) and one or more Object Storage Targets (OST); and
   computer-executable logic encoded in memory of one or more computers in communication with the luster file system to enable managing of I/O received with the Lustre file system, wherein the computer executable logic is configured for the execution of:
   using a Parallel Logged File system (PLFS) on the OSDs and OSTs to provide data storage for the Lustre file system;
   receiving a data I/O request, wherein the data I/O request relates to data stored within the Lustre file system;
   processing the data I/O request in a journal stored on a fast flash data storage device within the Lustre file system;
   analyzing the journal to make a determination related to the data I/O request;
   wherein each OSD within the Lustre file system is enabled to communicate with other OSDs within the Lustre file system to facilitate the analyzing and to provide hints for data placement;
   providing hints for data placement, wherein the two or more OSDs are in communication to facilitate data placement;
   wherein the analyzing comprises:
      analyzing the data I/O requests recorded in the journal to determine whether one or more data blocks are associated with the data I/O request;
      based on a positive determination that one or more data blocks are associated with the data I/O request, pre-fetching the one or more data blocks; and
   based on a negative determination that one or more data blocks are not associated with the data I/O request, processing a write-back of one or more data blocks;
   and responding to the data I/O request.

5. The system of claim 4, wherein the Lustre file system is comprised of a first Lustre Object Store Server and a second Object Store Server; and
   wherein the analyzing comprises:
      analyzing, at the first Lustre Object Storage Server the data I/O requests recorded in the journal to determine whether one or more data blocks are associated with the data I/O request are located on the first Lustre Object Storage Server and the second Object Store Server;
      based on a positive determination, providing a hint to the second Object Store Server, wherein the hint is enabled to include information on data placement.

6. The system of claim 4, wherein the Lustre file system is comprised of a first Lustre Object Store Server and a second Object Store Server; and
- wherein the processing comprises
  - analyzing the data I/O request;
  - storing a journal of the data I/O request on a flash data storage device within the first Lustre Object Store Server; and
  - synchronizing the journal of the data I/O request with the second Object Store Server.

7. A computer program product for managing I/O received within a Lustre file system including two or more object-based storage devices (OSDs) and one or more object storage targets (OSTs), the computer program product comprising:
- a non-transitory computer readable medium encoded with computer-executable program code for using read signatures in replication, the code configured to enable the execution of:
- using a Parallel Logged File system (PLFS) on the OSDs and OSTs to provide data storage for the Lustre file system;
- receiving a data I/O request, wherein the data I/O request relates to data stored within the Lustre file system;
- processing the data I/O request in a journal stored on a flash data storage device within the Lustre file system;
- analyzing the journal to make a determination related to the data I/O request;
- wherein each OSD within the Lustre file system is enabled to communicate with other OSDs within the Lustre file system to facilitate the analyzing and to provide hints for data placement;
  - providing hints for data placement, wherein the two or more OSDs are in communication to facilitate data placement;
  - wherein the analyzing comprises:
    - analyzing the data I/O requests recorded in the journal to determine whether one or more data blocks are associated with the data I/O request;
    - based on a positive determination that one or more data blocks are associated with the data I/O request, pre-fetching the one or more data blocks; and
  - based on a negative determination that one or more data blocks are not associated with the data I/O request, processing a write-back of one or more data blocks;
  - and responding to the data I/O request.

8. The computer program product of claim 7, wherein the Lustre file system is comprised of a first Lustre Object Store Server and a second Object Store Server; and
- wherein the analyzing comprises:
  - analyzing, at the first Lustre Object Storage Server the data I/O requests recorded in the journal to determine whether one or more data blocks are associated with the data I/O request are located on the first Lustre Object Storage Server and the second Object Store Server;
  - based on a positive determination, providing a hint to the second Object Store Server, wherein the hint is enabled to include information on data placement.

9. The computer program product of claim 7, wherein the Lustre file system is comprised of a first Lustre Object Store Server and a second Object Store Server; and
- wherein the processing comprises
  - analyzing the data I/O request;
  - storing a journal of the data I/O request on a flash data storage device within the first Lustre Object Store Server; and
  - synchronizing the journal of the data I/O request with the second Object Store Server.

\* \* \* \* \*